R. K. HAY.
REMOVAL OF ASH AND CLINKER FALLING FROM THE GRATES OF BOILERS.
APPLICATION FILED AUG. 12, 1919.
1,324,671.
Patented Dec. 9, 1919.
5 SHEETS—SHEET 1.
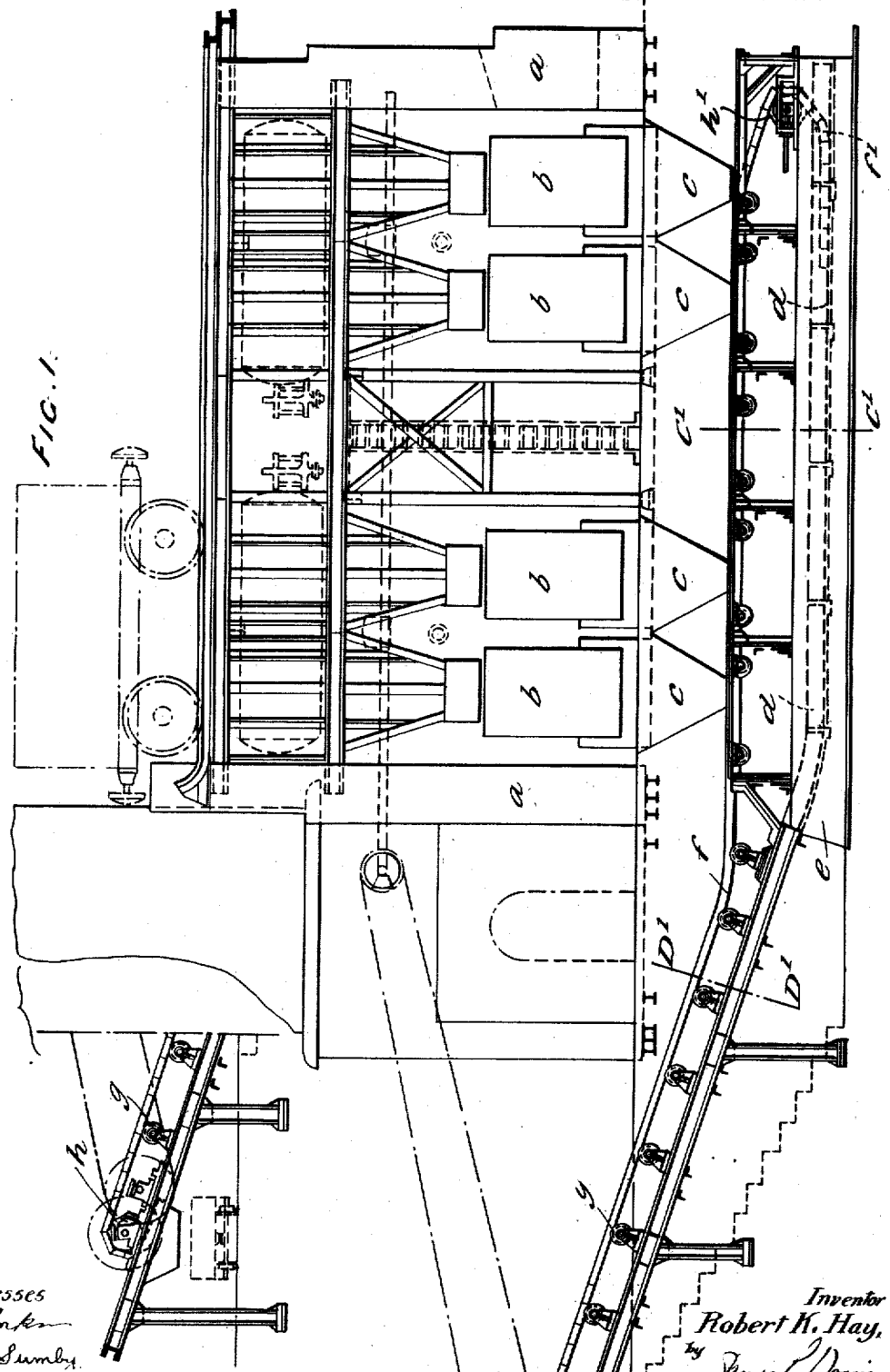
Witnesses
Inventor
Robert K. Hay,
by
Attorney.

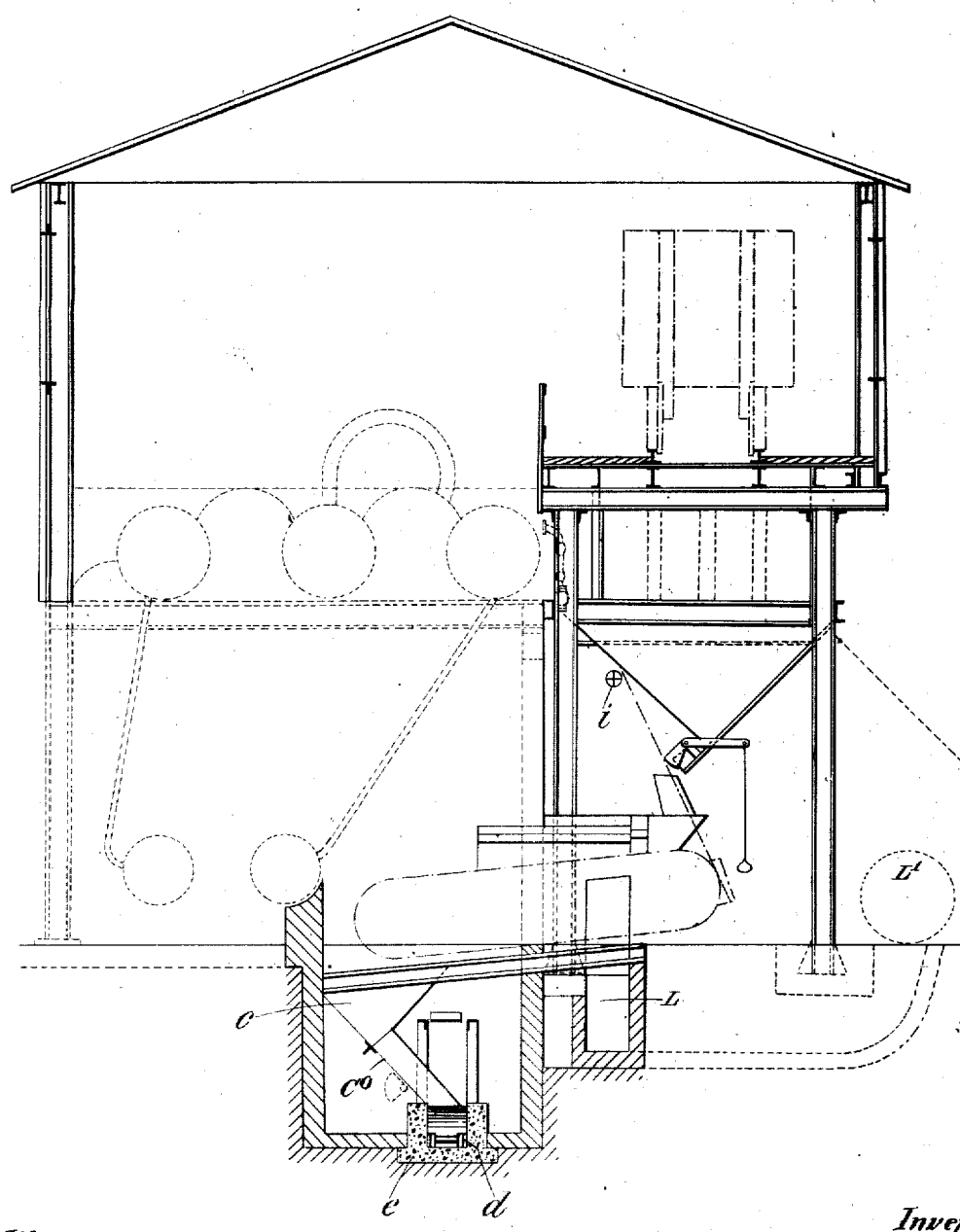

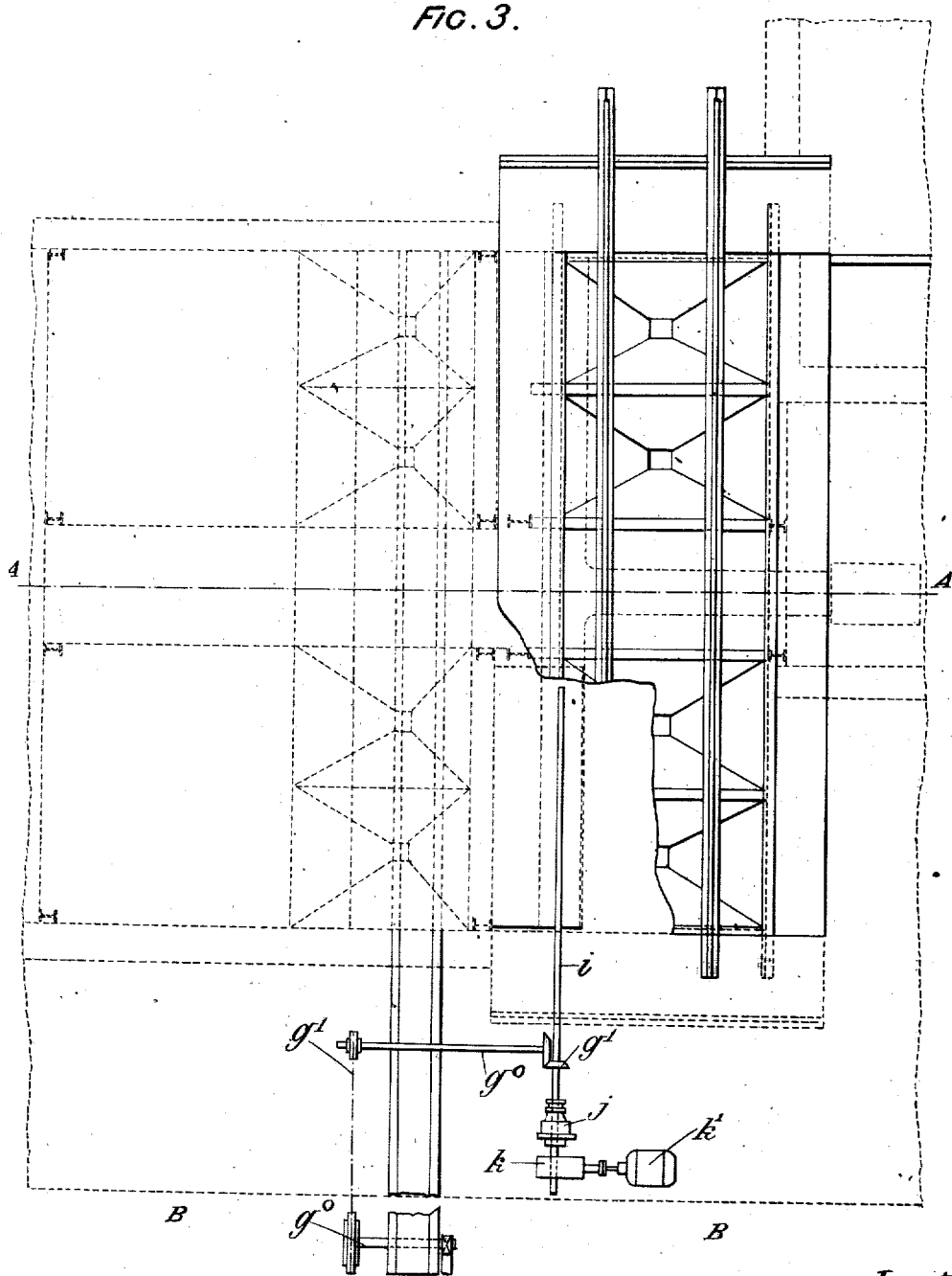

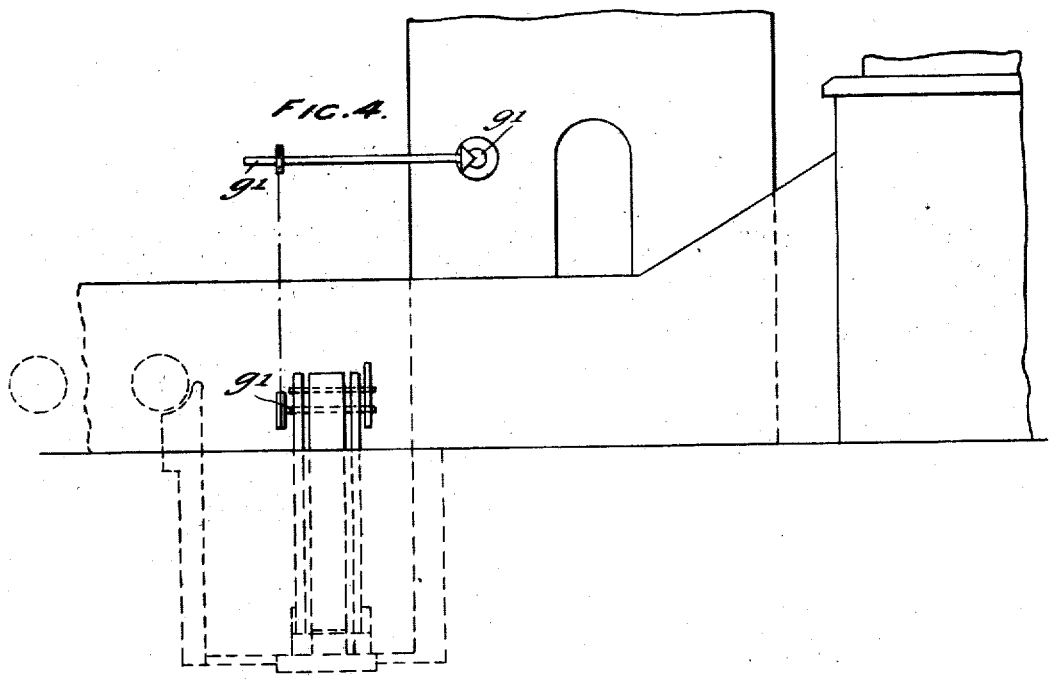
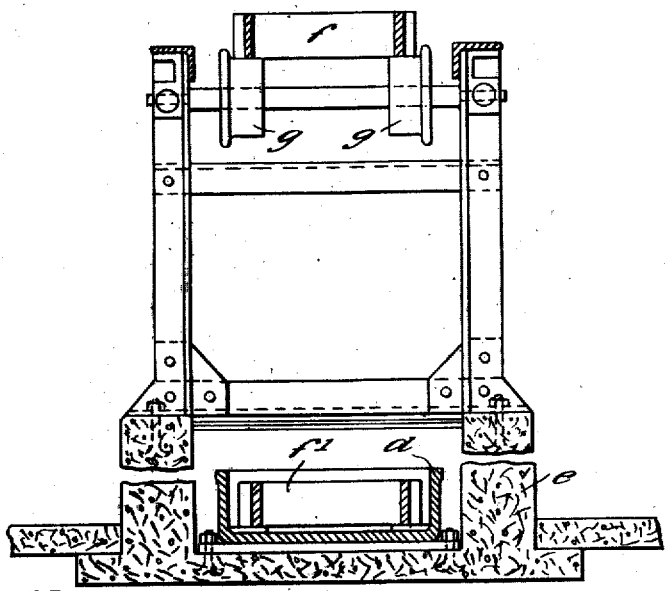
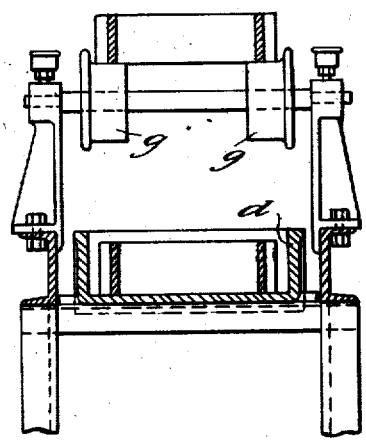

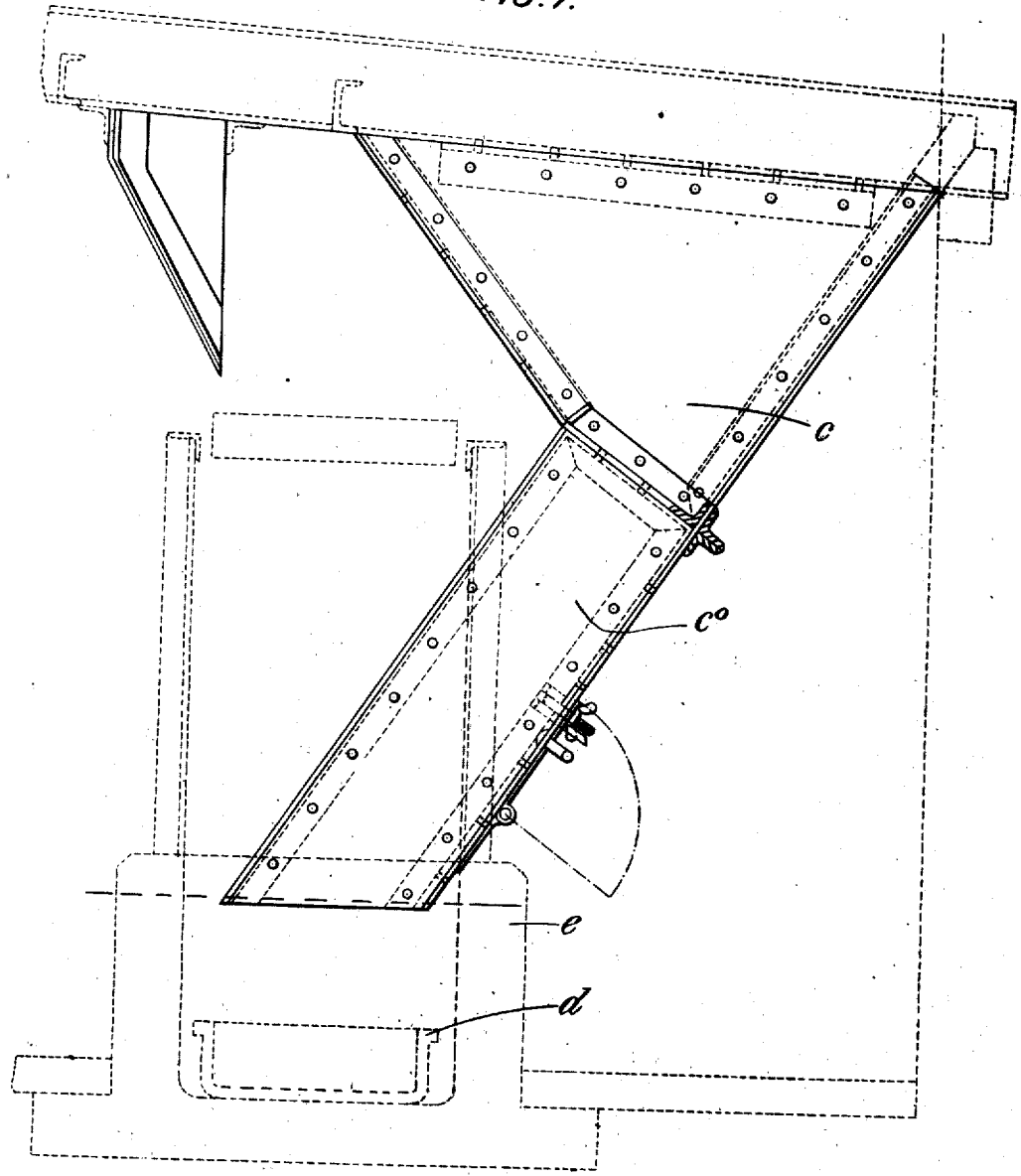

UNITED STATES PATENT OFFICE.

ROBERT K. HAY, OF CHOPWELL, ENGLAND, ASSIGNOR TO HIMSELF, AND UNDERFEED STOKER COMPANY LIMITED, OF LONDON, ENGLAND.

REMOVAL OF ASH AND CLINKER FALLING FROM THE GRATES OF BOILERS.

1,324,671.  Specification of Letters Patent.  Patented Dec. 9, 1919.

Application filed August 12, 1919. Serial No. 317,039.

*To all whom it may concern:*

Be it known that I, ROBERT KILGOUR HAY, a subject of the King of Great Britain, residing in Chopwell, England, have invented certain new and useful Improvements in or Relating to the Removal of Ash and Clinker Falling from the Grates of Boilers, of which the following is a specification.

This invention relates to apparatus for the removal of ash and clinker from furnaces.

According to the present invention, the ashes from the fire grate pass by force of gravity to the lower member of an endless chain conveyer operating in a water sealed trough and are removed by the conveyer beyond the water seal for further disposal, the operation being effected without admission of air to the combustion space of the furnace.

Apparatus made in accordance with this invention comprises a conveyer, preferably an endless chain belt of the known drag link or scraper type, moving along the bottom of a trough or trench under one or more furnaces, the trough bottom being inclined up at the ends so that it will contain water, and the return part of the chain running on a track above the trough. Ash chutes disposed between the underside of the furnace and the trough, having their ends below the water level in the trough and inclined sufficiently from the vertical to pass between the upper and lower parts of the chain conveyer, deliver the ashes on to the lower part of the chain.

The trough may be in a drift under the furnaces or it and the chutes may be built into and form part of the furnace setting, and the conveyer may be driven by any convenient means continuously or otherwise and extend beyond the furnaces to deliver the ash into wagons or otherwise for final disposal. By this means the combustion chamber is maintained continuously sealed; the ashes are quenched as they fall from the fire, very little power is required, and the other disadvantages enumerated above as inherent to previous systems are obviated.

One method of construction is shown in the drawings filed herewith of which Figure 1 is a diagrammatic elevation showing an application of the invention to a boiler house having two water tube boilers fitted with four mechanical stokers;

Fig. 2 is a cross section on line A—A of Fig. 3;

Fig. 3 is a plan;

Fig. 4 is an end elevation on B—B, Fig. 3;

Fig. 5 is a section through C'—C', Fig. 1;

Fig. 6 is a section through D'—D', Fig. 1;

Fig. 7 is a section through the hopper and conveyer frame.

$a$ $a$ are the walls of the boiler house and $b$ $b$ $b$ $b$ the grates of the boilers. Below each grate is a hopper $c$ with inclined chute $c^0$ adapted to receive the ashes from the grate and to discharge them into a cast iron trough $d$ which is disposed in a concrete trough $e$ running transversely of the boilers. The ends of the trough are inclined upward so that it may contain water. At one end of the cast iron trough the return of the scraper chain $f$ is taken over a suitable driving drum or spocket wheel $h$, and at the other end over a tension device $h'$. The return or upper part of the conveyer chain runs on a track formed by suitable rollers $g$ supported by a framework from the trough. The lower or operative part of the chain $f'$ conveys the ashes and clinker along the bottom of the trough $d$ to a tipping wagon or other suitable arrangement. The conveyer is adapted to be operated continuously by the same power which operates the mechanical stoker through shafting $g^0$ and gear $g'$, main stoker shafting $i$, friction clutch $j$, reduction gearing $k$ and motor $k'$ which drives all the plant. $L'$ is a fan and $L$ the main air duct to the stokers.

Having thus described the nature of the said invention and the best means I know of carrying the same into practical effect, I claim:—

1. Apparatus for removing ashes and clinker from furnaces comprising in combination a water sealed trough below the furnace, an endless scraper conveyer operating in said trough, means for supporting the return or inoperative side of the conveyer above the level of the trough and a hopper with a water sealed chute so positioned as to direct the ashes from the furnace into the trough between the upper and lower runs of the conveyer.

2. In boiler furnaces fitted with mechanical stokers, an apparatus for removing ashes from the furnace, comprising in combination a water sealed trough below the furnace, an endless chain conveyer operating in said trough, means for delivering the ashes from the furnace into the trough between the upper or return and lower or operative runs of the endless chain conveyer, said means comprising a water sealed chute, and means for driving the conveyer from the power shaft operating the mechanical stoker.

In testimony whereof I have signed my name to this specification.

R. K. HAY.